United States Patent [19]

Davis et al.

[11] 4,060,844
[45] Nov. 29, 1977

[54] SOLID STATE TRIPPING CIRCUIT

[75] Inventors: Lee Davis, Audubon, N.J.; Peter Pang, Hong Kong, Hong Kong

[73] Assignee: I-T-E Imperial Corporation, Spring House, Pa.

[21] Appl. No.: 658,354

[22] Filed: Feb. 17, 1976

[51] Int. Cl.$^2$ .............................................. H02H 3/08
[52] U.S. Cl. ........................................ 361/96; 361/98
[58] Field of Search .......... 317/33 SC, 36 TD, 141 S; 361/94–98, 100, 196–198

[56] References Cited

U.S. PATENT DOCUMENTS

| | | | |
|---|---|---|---|
| 3,327,171 | 6/1967 | Lipnitz et al. | 317/36 TD |
| 3,444,434 | 5/1969 | Zocholl | 317/36 TD |
| 3,786,311 | 1/1974 | Hobson et al. | 317/36 TD |
| 3,924,160 | 12/1975 | Maier et al. | 317/36 TD |
| 3,956,670 | 5/1976 | Shimp et al. | 317/36 TD |

Primary Examiner—A. D. Pellinen
Attorney, Agent, or Firm—Ostrolenk, Faber, Gerb & Soffen

[57] ABSTRACT

A solid state tripping circuit for sensing overcurrent conditions in a circuit connecting a power source to a load circuit and for controlling the operation of a circuit breaker in series in the circuit. The tripping circuit is responsive to different levels of current flow in the protected circuit to actuate the circuit breaker to the open condition after a variable time delay. The duration of the delay time is a function of the ratio of the overcurrent sensed to the rated circuit current. Energy for operation of the tripping circuit is supplied directly by the sensing circuit to eliminate a separate power supply.

12 Claims, 5 Drawing Figures

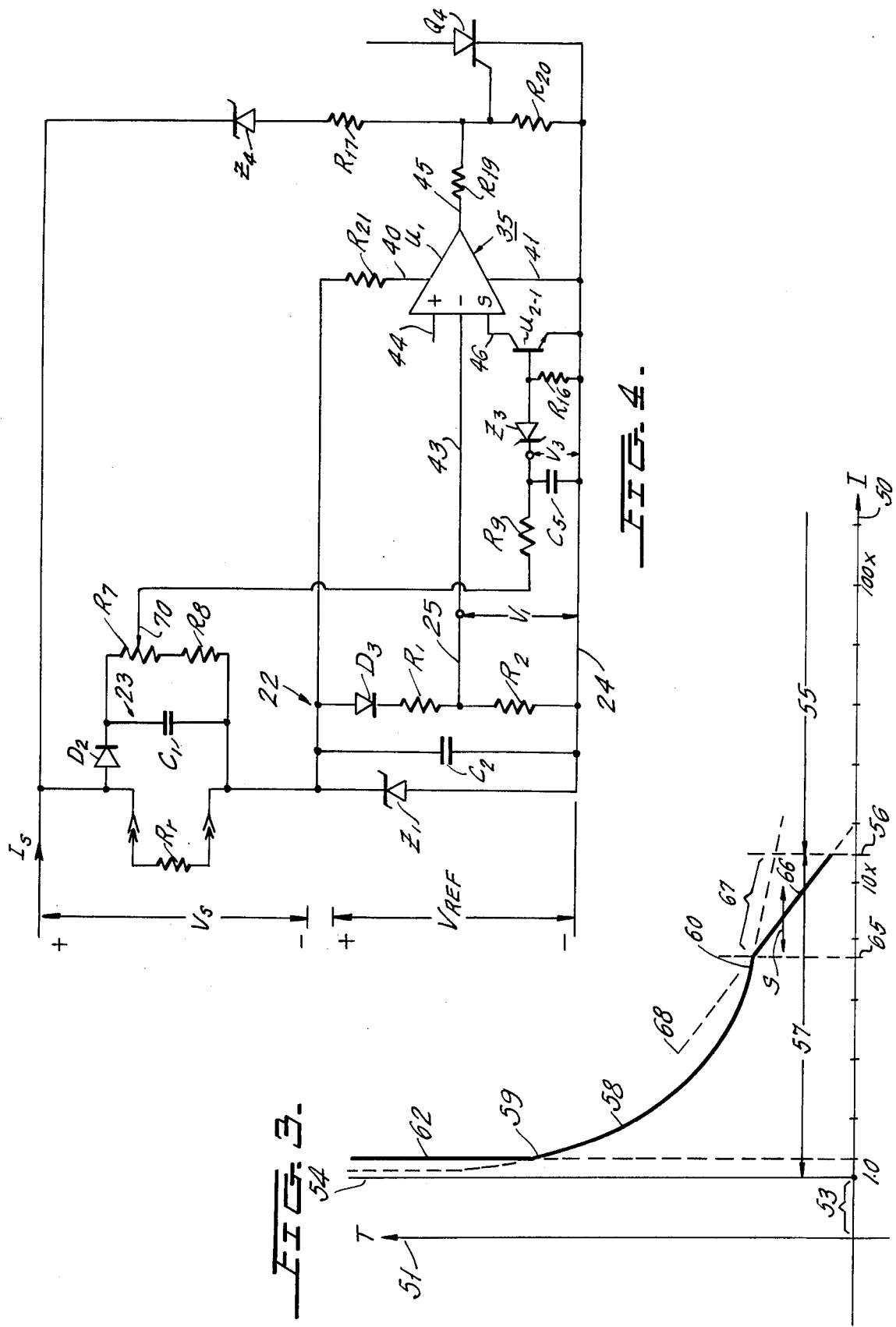

SOLID STATE TRIPPING CIRCUIT

BACKGROUND OF THE INVENTION

The present invention relates to circuit protection apparatus and more particularly to a novel solid state tripping circuit for controlling the operation of a circuit breaker.

A conventional circuit breaker may utilize a combination of electromagnetic and electrothermal mechanisms to initiate the mechanical separation of its current carrying contacts in the event of an excessive flow of current in the circuit protected by the circuit breaker.

A bimetallic element may thermoelectrically monitor the value of current flow for actuation of the mechanical contact separation mechanism after a long time delay established by the inverse current-squared-versus-time curve of the bimetallic element for circuit currents at least a selected percentage, e.g., 10%, greater than the rated current of the circuit breaker. A single long time delay curve is permanently established for a particular configuration of bimetallic element and cannot be easily varied to accommodate different values of rated current, initial and final points on the curve or rate of curve change. Disassembly of the circuit breaker and substitution of a different bimetal element is normally required to change the long time delay response of the conventional circuit breaker.

An electromagnetic trip coil may actuate the mechanical contact separation mechanism after a comparatively short time delay for overcurrent ratios greater than a range of ratios of the bimetal element. The time delay curve of the electromagnetic trip mechanism is a function of the number of conductor turns utilized and is inversely proportional to the magnitude of current flow through the coil. The curve is generally not adjustable without disassembly and replacement of selected parts of the circuit breaker unit.

Thus, the proper operation of the inter-related mechanical elements of a circuit breaker utilizing thermoelectric and electromagnetic trip mechanisms requires relatively precise and unadjustable parts and results in a relatively costly unit. The normal current rating of a particular conventional circuit breaker is not easily varied and it is not possible to test the function of the conventional circuit breaker unit without requiring disconnection of the line and load connectors therefrom.

It is desirable to provide a circuit breaker with a contact separation mechanism actuated by a tripping circuit having a maximum proportion of solid state components to realize a high degree of efficiency, reliability and economy while allowing the tripping circuit to be easily tested without removing line and load conductors from the circuit breaker. It is also desirable to provide a tripping circuit which will allow a full range of adjustment in the various time delays required for a range of over-current ratios, as well as enabling the adjustment of the normal current rating of the circuit breaker unit over a relatively wide range with a minimum number of component adjustments.

STATE OF THE ART

A series of static relays, each capable of monitoring line conductor current flow to actuate a separable contact mechanism to its open condition, is described and claimed in U.S. Pat. Nos. 3,319,127 to Zocholl et al.; 3,573,555, and 3,327,171 to Lipnitz et al.; and 3,766,436 to Zocholl, all of which patents have been assigned to the assignee of the present invention. These static relays provide solid state circuitry, utilizing a time delay network requiring a plurality of resistors and capacitors to achieve a single inverse current-time relationship. High-precision resistors and capacitors are required and their values are obtained from the solution of a set of simultaneous equations, whereby network design and adjustment for a different delay relationship is a somewhat lengthy process. Additional components, in the form of clamp diodes and a clamp multivibrator, are necessary to allow rapid adjustment of the delay time. Adjustment of the current rating of the prior art relay required simultaneous replacement of several components. Substantially instantaneous triggering of the contact mechanism for all line currents over a selected overcurrent ratio was not possible, as the delay of the R-C network always determined the current-time relationship.

A solid state tripping circuit is desired which realizes even greater reduction of adjustable component count and cost, while maximizing efficiency, reliability and range of operable over-current ratios.

BRIEF SUMMARY OF THE INVENTION

In accordance with the invention a solid state tripping circuit, for use with a circuit breaker contact separation mechansim, comprises means for generating a signal current proportional to the highest peak current flowing in any of the circuit conductors coupled through the contact separation mechanism; rating circuit means for generating a signal voltage proportional to the signal current; solid state circuit means for generating a trigger signal in accordance with a variable signal-voltage-versus-time curve; means responsive to a flow of current for actuating the contact separation mechanism; and solid state means for switching the signal current to the actuating means responsive to the trigger signal, to cause the contact separation mechanism to substantially simultaneously open all of the circuit conductors.

The trigger signal generating means comprises separate instantaneous, short time delay and long time delay trip circuits having paralleled inputs and outputs. Schmitt trigger means generates the trigger signal responsive to the energization of any of the three paralleled timing circuit outputs. The current-time relationship of each timing circuit is independently adjustable to allow synthesis of a wide range of inverse over-current versus trip-time relationships. The instantaneous trip circuit causes separation of the circuit-breaker contacts as soon as the current flowing in a conductor exceeds a selected high multiple of the rated current. The short time delay circuit causes contact separation according to a selected current-versus-time-duration curve when the magnitude of current flow is less than the selected high multiple but greater than a selected intermediate multiple of the rated current. The long time delay circuit initiates contact operation with increasingly long time delays as the magnitude of the over-current flowing in the conductors approaches the rated current value along a current-squared-versus-time-curve.

Pick-up circuit means monitors the signal voltage to reset the long time delay circuit whenever the line current is less than a small percentage greater than the rated current to prevent separate short time intervals at low over-current ratios from accumulating to cause contact separation.

Reference circuit means are utilized to provide the required operating voltages for the solid state components.

Therefore, it is a primary object of the present invention to provide a novel solid state tripping circuit for actuating the contact separation mechanism in a circuit breaker.

It is another object of the present invention to provide a novel solid state tripping circuit enabling the adjustment over a wide range of the normal current rating of the circuit breaker.

It is still another object of the present invention to provide a solid state tripping circuit having an adjustable overcurrent-ratio versus tripping-time-delay relationship.

It is yet another object of the present invention to provide a novel solid state tripping circuit adapted to synthesize a wide range of overcurrent versus actuation time relationships.

It is a further object of the present invention to provide a novel solid state tripping circuit for use in a circuit breaker and capable of being tested without requiring the removal of line and load conductors from the circuit breaker unit.

It is a still further object of the present invention to provide a circuit breaker having a novel solid state tripping circuit receiving its operating power directly from a circuit breaker current sensing circuit to eliminate the need for a separate power supply.

These and other objects of the present invention will become apparent from a reading of the following detailed description and the drawing figures.

BRIEF DESCRIPTION OF THE DRAWINGS

FIG. 3 is a graph illustrating the relationship between peak conductor current and tripping time for the solid state tripping circuit of the present invention;

FIG. 4 is a partial schematic drawing of the solid state trip circuit and useful in understanding the operation of the short time delay circuits.

DETAILED DESCRIPTION OF THE INVENTION

Figure 1:
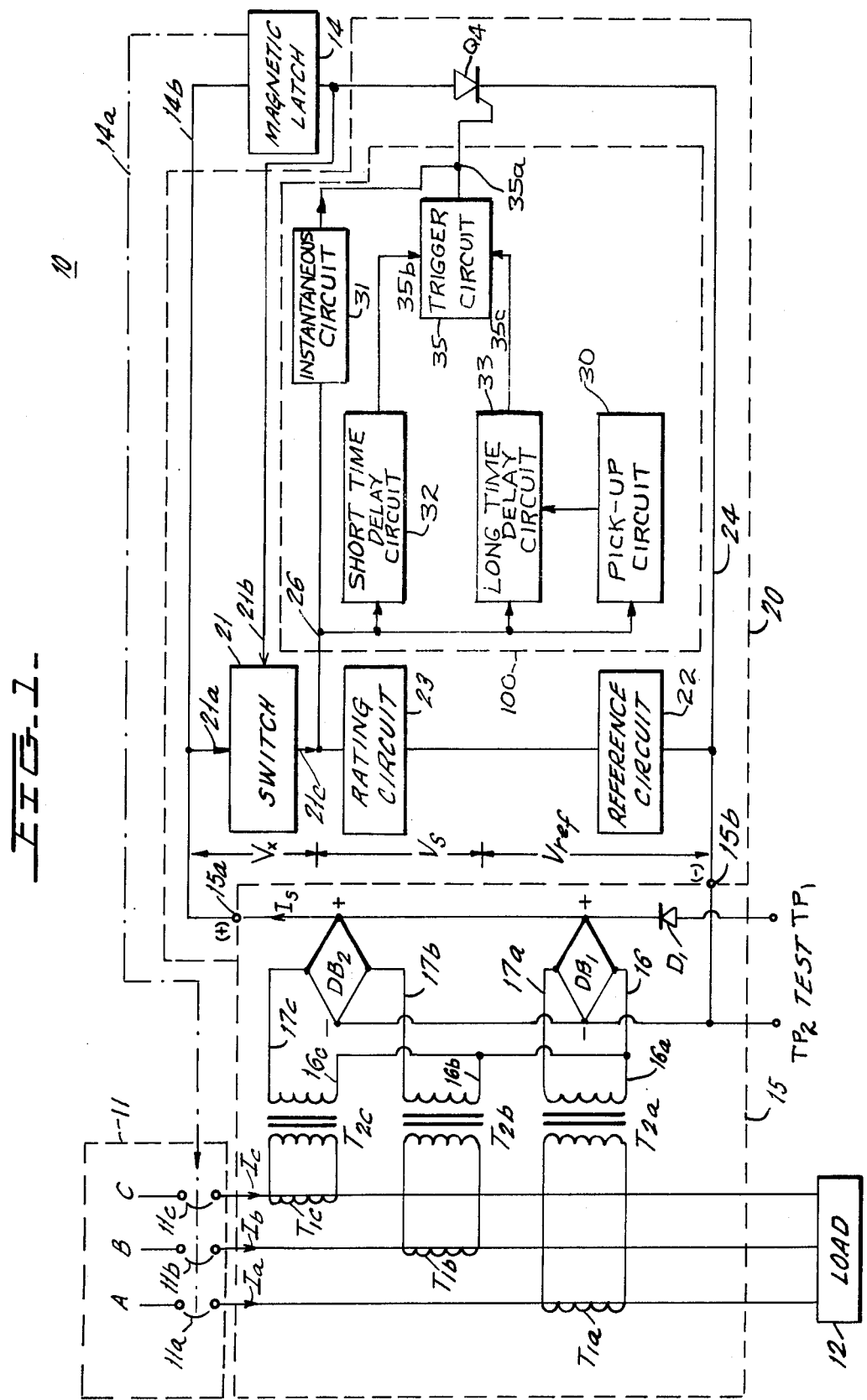
FIG. 1 is a block diagram of a solid state tripping circuit in accordance with the principles of the present invention and of the circuit breaker contact separation mechanism with which it is used.
Figure 2:
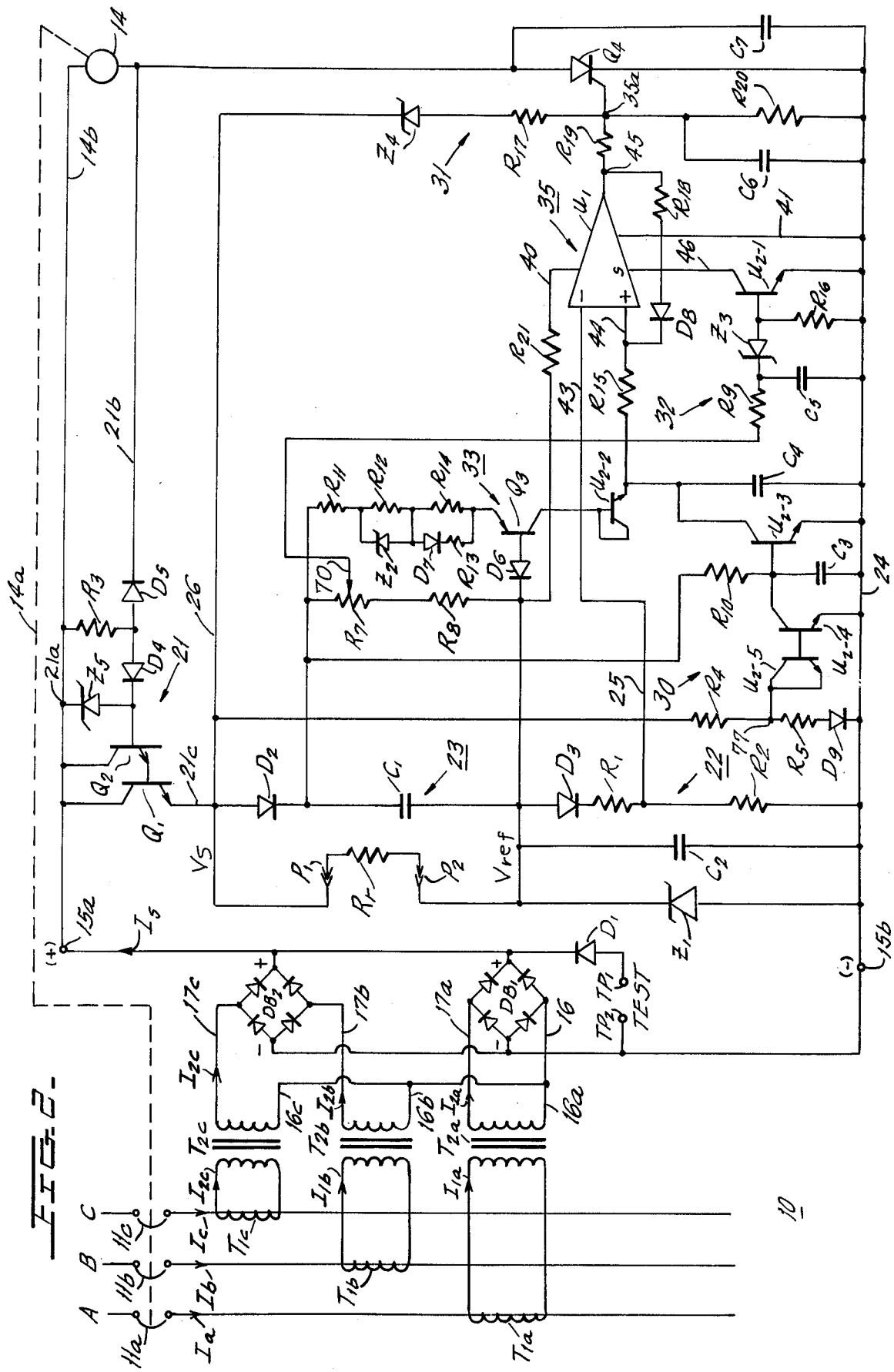
FIG. 2 is a schematic diagram of the solid state tripping and current sensing circuits of the present invention.

Referring to FIGS. 1 and 2, a circuit breaker 10 includes a contact mechanism 11 comprising first, second and third separable contact mechanisms 11a, 11b and 11c, respectively. Contact mechanisms 11a, 11b and 11c are connected in series with an associated power conductor A, B and C, respectively, between a power source (not shown) and an external load device 12. A magnetic latch mechanism 14 is mechanically coupled at broken line 14a to the three contact mechanisms 11a, 11b and 11c and is adapted to cause substantially simultaneous separation of the contacts, and hence interruption of the currents flowing in all of conductors A, B and C, responsive to a flow of operating current in the electrical input line 14b of magnetic latch 14. While the present invention is described in terms of operation in a three-phase, three-wire circuit, it should be understood that the present invention is equally applicable to any power carrying circuit having at least one conductor exclusive of any return conductor, and that contact separation mechanism 11 may be of any type consistent with the current interruption requirements and the capacity to be actuated by means of a latch mechanism responsive to an electrical input.

Sensing and power circuit 15 monitors the current flowing in each of conductors A, B and C to generate a flow from output terminal 15a of signal current $I_s$ proportional to the highest peak current flowing in any of the three power circuit conductors. A first current transformer $T_{1a}$, $t_{1b}$ and $T_{1c}$, respectively, is in series with each power conductor A, B and C. The secondary winding of each of transformers $T_{2a}$, $T_{2b}$ and $T_{2c}$, are connected together to form a common lead 16 coupled to one ;nput of a first diode bridge $DB_1$. The remaining secondary winding lead 17a of transformer $T_{2a}$ is coupled to the remaining input of first diode bridge $DB_1$ and the remaining secondary winding leads 17b and 17c of second transformers $T_{2b}$ and $T_{2c}$, respectively, are connected to the inputs of a second diode bridge $DB_2$. The positive (+) outputs of both bridges are coupled together to sensing circuit positive output 15a. The negative (−) outputs of both diode bridges $DB_1$ and $DB_2$ are coupled together to sensing circuit negative output 15b.

Illustratively, contact mechanism 11 may be rated for a maximum current of 800 Amperes (A.) and utilized in a particular application with a normal rated current of 400 A. flowing in each of conductors A, B and C. First transformers $T_{1a}$, $T_{1b}$ and $T_{1c}$ may advantageously produce secondary winding currents $I_{1a}$, $I_{1b}$, $I_{1c}$ each of the order of 3 A. without transformer saturation or excessive nonlinearity. Second transformers $T_{2a}$, $T_{2b}$ and $T_{2c}$ are each selected to further step-down the 3 A. primary winding current to secondary winding currents $I_{2a}$, $I_{2b}$ and $I_{2c}$ each of the order of 50 milliamperes (ma).

The instantaneous current available from each power conductor varies as a function of phase and load, whereby only one of currents $I_{2a}$, $I_{2b}$ or $I_{2c}$ will be instantaneously greater than the remaining currents. The largest current will flow through one of diode bridges $DB_1$ or $DB_2$ to generate a voltage across the equivalent load between sensing circuit outputs 15a and 15i b. This voltage back-biases the diode associated with the remaining current paths through diode bridges $DB_1$ and $DB_2$ to prevent the passage of the lesser magnitude currents generated by the remaining line currents. Thus, signal current $I_s$ flowing from positive output 15a will always be proportional to the highest peak current flowing in any of power conductors A, B and C.

Current sensing circuit 15 also includes a pair of test points $TP_1$ and $TP_2$. Positive test point $TP_1$ is coupled through a protective diode $D_1$ to sensing circuit output 15a while negative test point $TP_2$ is directly connected to sensing circuit negative output 15b. Protective diode $D_1$ forms an OR circuit in conjunction with diode bridges $DB_1$ and $DB_2$ to allow injection of an artificially excessive current flow to sensing circuit output terminal 15a for testing of the solid state tripping circuit in a manner to be more fully explained hereinbelow.

Solid state tripping circuit 20 includes a solid state switch 21 having an input 21a coupled in parallel with magnetic latch input circuit 14b to sensing circuit output terminal 15a for receiving signal current $I_s$. The state of switch 21 is determined by the voltage at a control input 21b. A high control voltage on line 21b back-biases diode $D_5$ and allows the signal current's to flow through a series-connected circuit comprised of resistor $R_3$ and forward-biased diode $D_4$ to supply base drive to saturate the Darlington-connected transistor pair $Q_1$ and $Q_2$. Signal current $I_s$ flows through the low-resistance collector-emitter circuit of transistor $Q_1$ to switch output 21c. A zener diode $Z_5$ protects the base-collector junction of transistors $Q_1$ and $Q_2$ against the application of a damaging voltage during high overcurrents.

A reference circuit 22 and a rating circuit 23 are series connected between switch output 21c and tripping circuit common bus 24. Signal current $I_s$ flows through zener diode $Z_1$ in reference circuit 22 to provide a reference voltage $V_{ref}$. A capacitor $C_2$ in parallel connection with zener diode $Z_1$ filters transients to maintain a fixed voltage across the zener diode. A voltage divider is formed by series-connected resistors $R_1$ and $R_2$ across the reference voltage and utilizes a forward-biased diode $D_3$ to thermally compensate the reference divider to remove temperature drift effects from the voltage on a reference bus 25.

Rating circuit 23 comprises a rating plug-in resistor $R_r$ for generating a signal voltage $V_s$ proportional to the signal current $I_s$ flowing therethrough. Rating plug resistor $R_r$ is generally external to a circuit board (not shown) on which the elements of solid state tripping circuit 20 are mounted. A pair of plug contacts $P_1$ and $P_2$ interchangeably receive rating plug resistors of differing values. A plug-in resistor $R_r$ of fixed resistance value may be replaced by a fixed resistor and potentiometer in series-connection between plugs $P_1$ and $P_2$ to allow continuous adjustment of rating plug resistance. The voltage generated by signal current $I_s$ across rating plug resistor $R_r$ is filtered by a capacitor $C_1$. A diode $D_2$ is in series connection with filter capacitor $C_1$ to prevent discharge of the capacitor through the relatively low resistance of the rating plug resistor; the use of diode $D_2$ allows use of a reduced capacitance value for capacitor $C_2$ while maintaining an adequate level of filtering.

In the normal condition, switch 21 is in the ON condition and a negligible voltage $V_x$ appears between its input 21a and its output 21c. The voltage, developed by signal current $I_s$ between sensing circuit output terminals 15a and 15b, is equal to the sum of $V_{ref}$ and $V_s$. The magnitude of $V_{ref}$ is determined within substantially narrow limits by the zener voltage required for biasing the active components of the tripping circuit. The sum of the $V_{ref}$ and $V_s$ is set equal to a selected voltage amplitude for all values of rated current whereby only the magnitude of rating resistor $R_r$ is varied to maintain a uniform signal voltage magnitude as the rated current, and hence signal current $I_{sr}$ is varied over a wide range responsive to the magnitude of different external loads 12.

Illustratively, if $V_{ref}$ is 8.2 volts and $R_r$ is 26 ohms for a signal current of 50 m.a. and a rated line current of 400 A., the constant voltage from bus 26 to common bus 24 is established as 9.5V. A change in the rated current value of circuit breaker 10, to 600 A. or 800 A., requires a variation of the value of a single component, rating plug resistor $R_r$, to a resistance value of 17⅓ ohms or 13 ohms, respectively, whereby the increased magnitude of signal current $I_{sr}$ 75 ma. or 100 ma., respectively, always generates a rated signal voltage $V_s$ of 1.3 volts.

Advantageously, plug contacts $P_1$ and $P_2$ may be installed on the operating control panel of the circuit breaker housing to facilitate rapid setting of the rated current value of the circuit breaker.

The signal voltage at 21c (which is a function of the signal current $I_s$) is applied to a timing circuit 100 which generates a trigger signal at its output 35a responsive to a predetermined relationship between the magnitude of the signal current and a time duration which the signal current is present. Preferably, the predetermined relationship is that illustrated in FIG. 3. The curve of FIG. 3 is described in detail below and represents an inverse current-squared-versus-time curve which is typical of thermonic circuit breakers.

Timing circuit 100 includes a pick-up 30, a long time delay circuit 33, a short time delay circuit 32, and instantaneous circuit 31 and a trigger circuit 35. Long time delay circuit 33 controls the operation of timing circuit 100 for all values of line current I falling between lines 62 and 65 of FIG. 3. Short time delay circuit 32 controls the operation of timing circuit 100 for all values of line current I falling between lines 65 and 56 of FIG. 3. Instantaneous circuit 31 controls the operation of timing circuit 100 for all values of line current I which are greater than that represented by line 56 of FIG. 3.

A pick-up circuit 30 is connected across rating circuit 23 and reference circuit 22 and prevents long time delay circuit 33 from enabling trigger circuit 35 when the line current I is below a predetermined value represented by line 62 of FIG. 3. In the preferred embodiment, this value is 115% of the rated time current.

A trigger circuit 35 is coupled to the output of time delay circuits 32,33 and generates a trigger signal at its output 35a whenever either time delay circuit 32,33 is enabled. Trigger circuit 35 is of the Schmidt-trigger type and has an output 35a substantially instantaneously changing from a low level to a high level responsive to energization of one of its trigger inputs 35c. Whenever instantaneous circuit 31 is enabled, it directly applies a high level to output 35a. A high level at trigger circuit output 35a is coupled to the gate electrode of an SCR $Q_4$ to fire the SCR and provide a low resistance path between magnetic latch input circuit 14b and common bus 24. Whenever SCR $Q_4$ is fired, a low voltage level is applied to control input 21b of switch 21 simultaneously with the high level at trigger circuit output 35a. The low control voltage level forward-biases diode $D_5$ of switch 21 to remove base drive from Darlington-connected transistor pair $Q_1$ and $Q_2$ to place switch 2 in the OFF condition, removing the relatively low impedance of series-connected reference curcuit 22 and rating circuit 23 shunting the relatively higher impedance of the input circuit of magnetic latch 14 and allowing signal current $I_s$ to actuate magnetic latch 14 to substantially simultaneously open contact mechanisms 11a, 11b and 11c to interrupt the flow of current in power conductors A, B and C.

Figure 5:
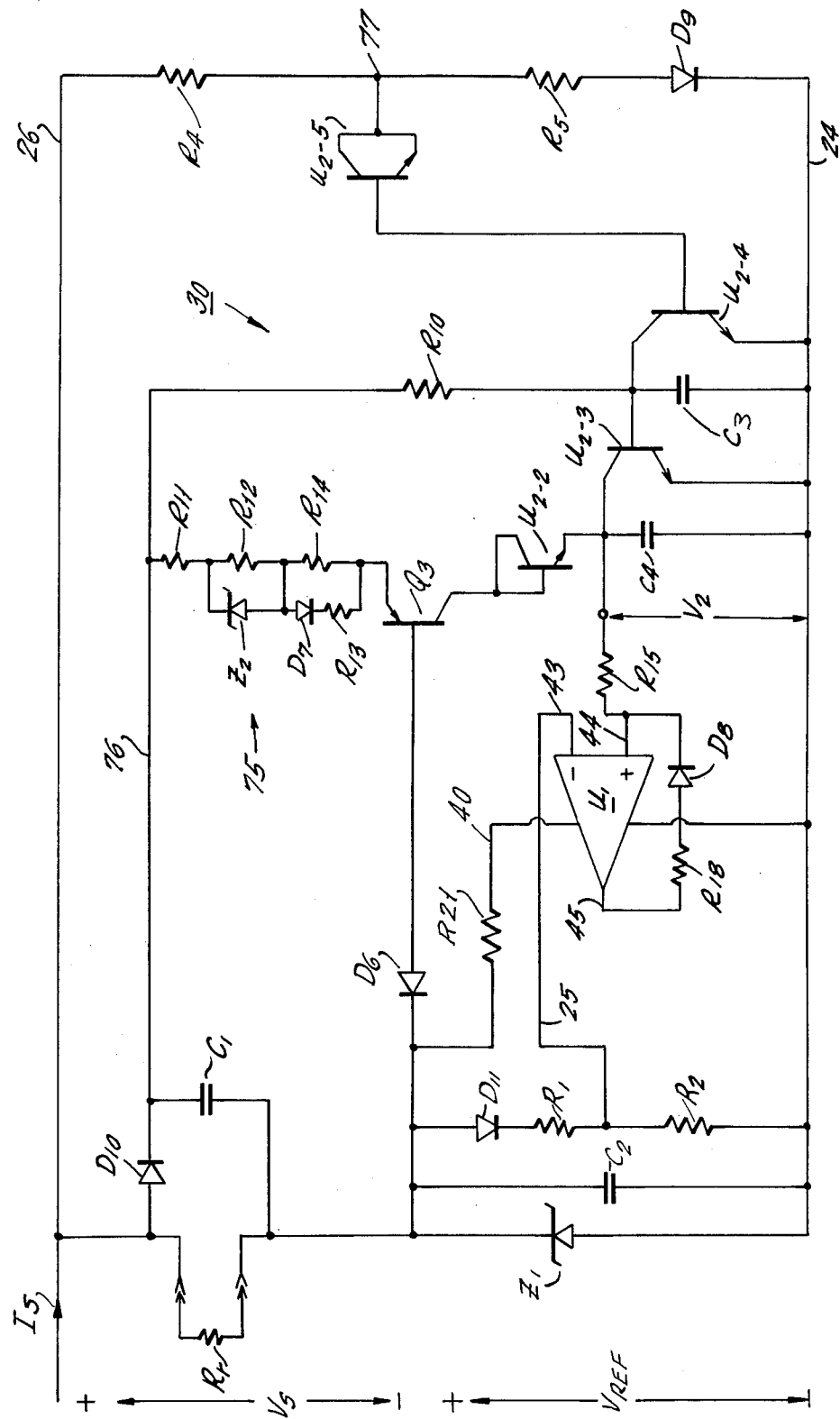
FIG. 5 is another partial schematic diagram of the solid state tripping circuit and useful in understanding the operation of the long time delay circuitry and of the resetting pick-up circuit therefore.

Trigger circuit 35 comprises an operational amplifier $U_1$ which may advantageously be an integrated circuit device having improved temperature compensation, reliability and switching accuracy over a circuit utilizing discrete transistors. The reference voltage $V_{ref}$ of reference circuit 22 provides a flow of operating current through series limiting resistor $R_{21}$ to the positive supply lead 40 of the operational amplifier, with current return via negative supply lead 41 to common bus 24. An inverting input 43 is biased at a first input voltage $V_1$ (FIG. 4) and a non-inverting input 44 is coupled through limiting resistor $R_{15}$ to a second input voltage $V_2$ (FIG. 5). The voltage at the output 45 of operational amplifier $U_1$ increases when the voltage at non-inverting input 44 reaches a trigger level equal to or higher than the first voltage $V_1$ at inverting input 43. Positive feedback is established by a series-connected resistor $R_{18}$ and forward-biased diode $D_8$ connected between output 45 and non-inverting input 44 to form a regenerative Schmitt trigger circuit, whereby output 45 rapidly increases to a high level, generally equal to the amplitude of the positive supply voltage on lead 40, with a negligibly short time delay after the voltage of non-inverting input 44 exceeds the reference voltage.

Current from operational amplifier output 45 flows to the gate electrode of SCR $Q_4$ to initiate SCR turn-on to form a low resistance anode-cathode circuit. A series resistor $R_{19}$ limits the peak current into the SCR gate electrode. Another resistor $R_{20}$ shunts the SCR gate-cathode resistance to prevent triggering of the SCR by leakage currents. A capacitor $C_6$ in parallel with resistor $R_{20}$ provides filtering to reduce the high frequency "noise" voltage level and prevent nuisance triggering of the SCR.

A filter capacitor $C_7$ is connected in parallel with the anode-cathode circuit of the SCR to suppress high voltage transients and prevent nuisance turn-on or destruction of the SCR and hence the tripping circuit.

Triggering circuit 35 also receives a third input voltage $V_3$ (FIG. 4) across a series circuit comprising a zener diode $Z_3$ and the base-emitter junction of one transistor $U_{2-1}$ of multiple-transistor array contained in a second integrated circuit device $U_2$. The emitter-collector circuit of transistor $U_{2-1}$ is connected between common bus 24 and a strobe input 46 of operational amplifier $U_1$. When third input voltage $V_3$ increases to a magnitude equal to or greater than the sum of zener voltage $V_{z3}$ of zener diode $Z_3$ and the base-emitter voltage of transistor $U_{2-1}$, the transistor turns on to drop the voltage at strobe input 46 to a low level, causing an increase in the voltage at operational amplifier output 45 to trigger the SCR. Thus, magnetic latch 14 is independently actuated by a high voltage level at either the second or the third voltage inputs.

Referring now to the graph of FIG. 3, increasing values of overcurrent ratio I (the ratio of the highest peak current flowing in any of line conductors A, B or C to the rated current of circuit breaker 10) are plotted along logarithmic-scaled abscissa 50 while increased values of time delay T are plotted along ordinate 51. Under normal operating conditions, external load 12 can draw line currents less than or equal to the rated current for an indefinitely long period without causing actuation of trip circuit 20. Thus, for an over-current ratio I in region 53 having a value less than one or for an over-current ratio along line 54 having a value equal to one, the SCR must remain in its non-conducting condition for all time. Conversely, relatively "instantaneous" or override triggering of the SCR is desired in region 55 wherein negligible time delay T, of the order of microseconds in the electronic circuitry 20, is achieved for over-current ratios greater than a first selected over-current limit 56. Typical values for the first over-current ratio are of the order of 15 times.

This instantaneous trip characteristic is provided by instantaneous timing circuit 31 (FIG. 2) comprising a zener diode $Z_4$ in series connection with a current limiting resistor $R_{17}$ to trigger the gate electrode of the SCR and cause immediate actuation of magnetic latch 14 whenever the sum of the reference and signal voltages $V_{ref}$ and $V_s$, respectively, is equal to or greater than the sum of the zener voltage $V_{z4}$ of zener diode $Z_4$ plus the gate-cathode voltage of the SCR. Thus, zener voltage $V_{z4}$ sets the pick-up level above which level instantaneous timing circuit 31 is energized; the instantaneous pick-up voltage is varied by selection of the zener voltage of zener diode $Z_4$ without requiring use of settable resistance elements. Illustratively, for a circuit breaker having a rated current of 400 A., an over-current ratio of 15 is caused by a flow of 6000 A. instantaneous peak current in any of line conductors A, B or C, and causes a flow of signal current $I_s$ of 750 ma. and a signal voltage $V_s$ of 19.5 volts across a rating resistor $R_r$ of 26 ohms. The total voltage on bus 26 is 27.7 volts whereby a zener diode $Z_4$ having a zener voltage of 27 volts enables triggering of SCR. For even greater over-current ratios, the voltage on bus 26 rises to a value exceeding the zener voltage of zener diode $Z_4$ whereby resistor $R_{17}$ limits the gate current to protect and prevent damage to the SCR.

For overcurrent ratios in region 57 with line currents greater than the rated current but less than the peak current causing instantaneous trip, an inverse current-squared to trip-time relationship along curve 58 is generally required. Thus, relatively small overcurrent ratios in region 59 must exist for correspondingly greater periods of time to have the same heating effect on a conductor compared with the relatively shorter period of time required by a correspondingly greater overcurrent ratio in region 60 to produce the same heating effects.

A line current greater than the rated current may normally be drawn for short time intervals during certain aspects of load operation, such as by turn-on surge in an electric motor and the like. Pick-up circuit 30 is provided to reset long time delay circuit 33 for over-current ratios greater than one but less than a second over-current limit 62, independently established at approximately 115% of rated current, to prevent accumulation of short time intervals of load usage at relatively low over-current ratios and subsequent actuation of contact separation mechanism 11. Thus, operation curve 59 is modified to have a lower limit along line 62 to permit line currents less than the value of the second current limit to exist indefinitely without energizing long time delay circuit 33.

A current-versus-time relationship is enabled by short time delay circuit 32 for all overcurrent ratios greater than the short time circuit pick-up level 65. When the actuation time along the short time delay curve 66 is less than the actuation time along long time delay curve 58, in a region 67 between an intermediate over-current ratio limit 68 and instantaneous trip limit 56, the timing operation of solid state tripping circuit 20 in controlled by short time delay circuit 32. The short time delay curve 66 provides more rapid actuation of contact separation mechanism 11 relative to the inverse current-squared relationship of long time delay curve 58, to reduce the heating hazards of fault currents having over-current ratios in a range of the order of 5–15 times.

Short time delay circuit 32 comprises a variable voltage divider formed of potentiometer $R_7$ in series with a fixed resistance $R_8$ and receiving signal voltage $V_s$ across rating resistor $R_r$. The voltage at the adjustable tap 70 of potentiometer $R_7$ appears across the series-connected integrating network of resistance $R_9$ and integrator capacitor $C_5$. The voltage across integrator capacitor $C_5$ forms the third input voltage $V_3$ utilized at independent strobe input 46 of trigger circuit 35. The pick-up level 65 for short time delay circuit 32 occurs when the sum of the signal and reference voltages exceeds the zener voltage $V_{Z3}$ of zener diode $Z_3$ for the overcurrent ratio I at pick-up level 65.

In operation, the amplitude of signal voltage $V_s$ increases in proportion to an increase in peak line current. The proportional voltage increase at wiper arm 70 with respect to return bus 24 decreases the time required for integrator capacitor $C_5$ to charge to a voltage level greater than the zener voltage of zener diode $Z_3$ to activate transistor $U_{2-1}$ and trigger the SCR to cause contact mechanism 11 to interrupt current flow in power conductors A, B and C. The slope of short time delay curve 66 is established by the time constant of the integrating circuit and is proportional to the product of the resistance of the resistor $R_9$ and the capacitance of charging capacitor $C_5$. As the voltage charging the capacitor includes the essentially constant reference voltage $V_{ref}$ across zener diode $Z_1$, this current-time curve has a slope of the order of 1:1 to provide a greater selectivity in the establishment of the intermediate limit. The wiper arm 70 of potentiometer $R_7$ is adjusted to shift the short time delay curve as indicated by arrow S in FIG. 3, to establish the value of intermediate limit 65 as the over-current ratio I above which ratio the short time delay of curve 66 is less than the long time delay of curve 58 and hence becomes the trip characteristic of tripping circuit 20.

Long time delay circuit 33 comprises a timing capacitor $C_4$ supplied with charging current by a current-source transistor $Q_3$ having a non-linear resistance network 75 (FIG. 5) in series with its emitter-collector circuit. The base of transistor $Q_3$ is coupled via protection diode $D_6$ to the reference voltage $V_{ref}$. The sum of the reference voltage and the filtered signal voltage at the cathode of diode $D_{10}$ is coupled across nonlinear resistance network 75 and the base-emitter junction transistor $Q_3$. The magnitude of charging current flowing from the collector of transistor $Q_3$ to timing capacitor $C_4$ is proportional to the magnitude of signal voltage, and hence peak line current, and inversely proportional to the resistance between bus 76 and the emitter electrode of transistor $Q_3$.

The non-linear resistance network 75 is formed of series-connected resistors $R_{11}$, $R_{12}$ and $R_{14}$. A zener diode $Z_2$ shunts resistor $R_{12}$ and a series network of diode $D_7$ and resistor $R_{13}$ shunts resistor $R_{14}$. For relatively low values of signal voltage $V_s$, the voltage drops across resistors $R_{12}$ and $R_{14}$ are insufficient to cause conduction of either zener diode $Z_2$ or diode $D_7$; the magnitude of charging current is established by the sum of all three network resistors $R_{11}$, $R_{12}$ and $R_{14}$ and capacitor $C_4$ charges with a first RC time constant. As the line current and hence the signal voltage increases, the voltage across resistor $R_{14}$ increases to a value sufficient to cause diode $D_7$ to conduct and place resistor $R_{13}$ in parallel with resistor $R_{14}$ to reduce the total series resistance of network 75 and create a second RC time constant for more rapidly increasing the voltage across timing capacitor $C_4$. Further increases in line current and signal voltage eventually increase the voltage drop across resistor $R_{12}$ to a level permitting zener diode $Z_2$ to conduct and effectively remove resistor $R_{12}$ from the charging network; a third and even more rapid charging RC time constant is created proportional to the sum of resistor $R_{11}$ and the parallel combination of resistors $R_{13}$ and $R_{14}$. Thus, a charging current curve having two switching points and three time constants is created to simulate a current-square versus time curve proportional to the square of the highest line current.

The voltage formed across timing capacitor $C_4$ is coupled to resistor $R_{15}$ and is the second input voltage to comparator $U_1$. When the voltage $V_2$ across capacitor $C_4$ increases to equal the voltage on bus 25, comparator $U_1$ triggers SCR $Q_4$ to actuate contact separation mechanism 11 and interrupt flow of current in the line conductors.

The diode formed by transistor $U_{2-2}$ prevents leakage current from flowing in the collector-base circuit of transistor $Q_3$ to reduce partial discharge of capacitor $C_4$ and enable increased accuracy and stability in timing and triggering. The use of a single timing capacitor $C_4$ in a long time delay circuit to approximate the current-squared heating effects has cost and space advantages and allows the current-time characteristic to be tailored to a desired shape by modification of simple resistances and the voltage of zener diode $Z_2$, in accordance with a relatively simple design procedure.

Pick-up circuit 30 includes, in addition to zener diodes $Z_3$ and $Z_4$ whose operation has been described hereinabove, a switch transistor $U_{2-3}$ (FIG. 5) having its saturated collector-emitter circuit in shunt across capacitor $C_4$ whenever the over-current ratio is less than second limit 62. A voltage divider formed of resistors $R_4$ and $R_5$ monitors the sum of reference and signal voltages on bus 26. The divider output at junction 77 is coupled to the base of a fourth array transistor $U_{2-4}$ through a series connected zener diode formed by the reverse-biased emitter-base junction of a fifth array transistor $U_{2-5}$. A forward-biased diode $D_9$ in series with divider resistor $R_5$ provides temperature compensation for thermally induced variations in the base-emitter voltage of transistor $U_{2-4}$. The collector-emitter circuit of transistor $U_{2-4}$ and a filter capacitor $C_3$ shunt the base-emitter circuit of switch transistor $U_{2-3}$ while a resistor $R_{10}$ supplied base drive current to transistor $U_{2-3}$ from filtered bus 26 and diode $D_2$.

In operation, a line current less than the long time delay circuit pick-up level at second limit 62, and of the order of 115% of rated current, provides a voltage at reference divider output 77 less than the sum of the zener voltage of transistor $U_{2-5}$ and the base-emitter voltage of $U_{2-4}$ to maintain transistor $U_{2-4}$ in the cutoff state. The value of resistor $R_{10}$ is selected to allow sufficient base current to flow to the base electrode of transistor $U_{2-3}$ to saturate that transistor when transistor $U_{2-4}$ is in the cutoff condition. Saturated transistor $U_{2-3}$ provides a low resistance path across timing capacitor $C_4$ to retain the terminal of capacitor $C_4$ coupled to the collector of $U_{2-3}$ at the negative potential of bus 24.

The values of reference divider resistors $R_4$ and $R_5$ are chosen to provide an output voltage at junction 77 sufficient to place transistor $U_{2-4}$ in the active condition when the line current, and hence the signal voltage, is equal to or greater than second limit 62. Activation of transistor $U_{2-4}$ bypasses the current supplied to the base of $U_{2-3}$ by $R_{10}$ to bus 24 switching transistor $U_{2-3}$ from the saturated to the cut-off condition to allow capacitor $C_4$ to charge, responsive to the flow of collector current from transistor $Q_3$, towards the trigger level of operational amplifier $U_1$ to enable tripping of the circuit breaker.

Capacitor $C_3$ operates in conjunction with base resistor $R_{10}$ to provide a short time delay for reestablishing saturation of switch transistor $U_{2-3}$ by controlling the time for the base-emitter voltage of the switch transistor to reach its forward conductive voltage and remove transistor $U_{2-3}$ from the cut-off condition. This short pick-up delay allows long time delay circuit 33 to continue charging between adjacent peaks of an alternating current waveform and also allows for momentary dips below the pick-up circuit threshold to eliminate variations between single phase and three-phase usage of the pick-up circuit. The value of delay capacitor $C_3$ is selected to cause transistor $U_{2-3}$ to saturate and reset the long time delay circuit when the line current being monitored falls below the pick-up threshold level 62 for a continuous period equal to a selected multiple number of generator cycles, typically of the order of 15.

Use of a relative small value of timing capacitor $C_4$ in the long time delay circuit, due to the extremely high input impedance of operational amplifier $U_1$, even further reduces the cost and the volume required to mount tripping circuit 20 within its circuit breaker 10.

Solid state tripping circuit 20 is tested by coupling a current source between test points $TP_1$ and $TP_2$ to provide a flow of current in the direction of arrow $I_s$ (FIG. 1). The value of test current is varied and the time interval between application of the test current and actuation of contact separation mechanism 11 is compared to the desired current-versus-time response curve. Diode $D_1$ and diode bridges $DB_1$ and $DB_2$ form an OR circuit, whereby tripping circuit 20 responds only to the larger current flowing therethrough; the circuit breaker line and load terminals need not be disconnected to enable flow of a varying value of test current, as the test current need not be related to the actual current then flowing through the primaries of line-current transformers $T_{1a}$, $T_{1b}$ and $T_{1c}$.

There has just been described a novel solid state tripping circuit providing a wide range of over-current-versus time relationships for causing the actuation of the contact separation mechanism in a circuit breaker. The tripping circuit enables a wide adjustment range of circuit breaker normal current rating and provides for an adjustable over-current-ratio versus tripping-time-delay relationship.

This novel invention has been described with reference to a preferred embodiment thereof; many variations and modifications will now become apparent. We do not wish, therefore, to be limited by the specific disclosure herein, but only by the appended claims.

What is claimed is:

1. Apparatus for interrupting a current flowing in a circuit having a normal rated current, comprising:
    means for interrupting the continuity of said circuit;
    means coupled to said circuit for generating a signal current proportional to a peak of said circuit current;
    timing circuit means responsive to said signal current for generating a trigger signal responsive to a predetermined relationship between the magnitude of said signal current and a time duration which said signal current is present;
    actuating means responsive to said trigger signal for actuating said circuit continuity interrupting means to terminate current flow in said circuit; and
    electronic switch means for applying at least a portion of said signal current to said timing circuit means prior to the generation of said trigger signal and for applying at least a portion of said signal current to said actuating means after the generation of said trigger signal whereby said timing circuit means is powered by said signal current prior to the generation of said trigger signal and said actuating means is powered by said signal current after the generation of said trigger signal.

2. Apparatus as set forth in claim 1, wherein said timing circuit means comprises:
    rating circuit means responsive to said signal current for generating a signal voltage having a predetermined relationship to said signal current; and
    means for generating a trigger signal responsive to a predetermined relationship between said signal voltage and a time duration during which said signal voltage is present.

3. Apparatus as set forth in claim 2, wherein said rating circuit means includes a plug-in resistive element for selecting the predetermined relationship between said signal current and said signal voltage.

4. Apparatus as set forth in claim 1, wherein said timing circuit means comprises:
    long time delay circuit means for causing said timing circuit means to generate said trigger signal according to a first line current vs. time curve whenever said circuit current is between a first value greater than said rated value and a second value greater than said first value;
    short time delay circuit means for causing said timing circuit to generate said trigger signal according to a second line current vs. time curve whenever said circuit current is below said second value and a third value greater than said second value; and
    instantaneous circuit means for causing said timing circuit to generate said trigger signal substantially instantaneously whenever said line current exceeds said third value.

5. Apparatus as set forth in claim 4, wherein said third value is at least 10 times greater than said rated current.

6. Apparatus as set forth in claim 4, further including pick-up circuit means for preventing said long time delay circuit means from causing said timing circuit means to generate said trigger signal when said line current is below said first value.

7. Apparatus as set forth in claim 4, wherein said first value is approximately 115% of said rated current.

8. Apparatus as set forth in claim 4, wherein said long time delay circuit means includes a non-linear resistive element and a capacitor connected in series and a means for generating said trigger signal when said capacitor charges to a predetermined value.

9. Apparatus as set forth in claim 8, further including pick-up circuit means for preventing said capacitor from charging while said line current is below said first value.

10. Apparatus as set forth in claim 9 wherein said short time delay current means includes a linear resistive element and a capacitor connected in series and a means for generating said trigger signal when said capacitor of said short time delay circuit means charges to a predetermined value.

11. Apparatus as set forth in claim 10 wherein said instantaneous means comprises a zener diode in series with a resistive element.

12. Apparatus for interrupting a current flowing in a circuit having a normal rated current, comprising:
    means for interrupting the continuity of said circuit;

means coupled to said circuit for generating a signal current proportional to a peak of said circuit current;

rating circuit means for generating a signal voltage proportional to siad peak current, the magnitude of said signal voltage being selected to be at a first predetermined value when said circuit current is equal to said rated current;

means for generating a trigger signal responsive to a predetermined relationship between said signal voltage and a time duration during which said signal voltage is present, said trigger signal generating means comprising first means for generating a first output signal substantially instantaneously responsive to said signal voltage exceeding a second predetermined value greater than said first value, second means for generating a second output signal in accordance with a first selected curve of the inverse of said signal voltage versus the time duration during which said signal voltage exists; third means for generating a third output signal in accordance with a predetermined inverse relationship between the square of the signal voltage and the time duration during which said signal voltage exists; and means for combining said first, second and third output signals to couple at least the first occurring output signal to an actuating means;

said actuating means being responsive to said trigger signal for actuating said circuit continuity interrupting means to terminate current flow in said circuit;

pick-up means for preventing said first, second and third means from reacting to a signal voltage less than a third predetermined value, said third value being greater than said first predetermined value and less than said second value, to prevent interruption of the continuity of said circuit for any flow of circuit current having a ratio to the normal rated current equal to the ratio of said third value to said first value;

said actuating means being a first switching element having a control electrode receiving said trigger signal, said first switching element adapted to activate said interrupting means when said trigger signal is present at said control electrode;

said third means comprising fourth means for storing a variable amount of an electrical quantity; fifth means for adding to said fourth means amounts of said electrical quantity substantially equal to the square of said signal voltage; and sixth means for comparing the amount of said electrical quantity stored in said fourth means to a fifth predetermined value and for generating said third output signal when the stored amount exceeds said fifth value;

said fourth means being a capacitive element; and said fifth means being a current source having an input receiving said signal voltage and an output, said output being coupled to said capacitive element and adapted to cause a flow of charge thereto varying substantially as the square of said signal voltage at said input of said current source; and said current source including a source of an essentially constant reference voltage; a semiconductor element having base, collector and emitter electrodes, said base electrode receiving said reference voltage from said source, said collector electrode coupled to said capacitive element; a non-linear resistance network coupled between said emitter electrode and said current source input, the resistance of said non-linear network being dependent upon the magnitude of the signal voltage across said non-linear network and approximating the square of the inverse of said signal voltage to generate a current to said capacitive element having said predetermined inverse relationship.

* * * * *